United States Patent [19]

Hattori et al.

[11] 4,452,069
[45] Jun. 5, 1984

[54] METHOD OF AND APPARATUS FOR SENSING KNOCKING IN INTERNAL COMBUSTION ENGINE

[75] Inventors: Tadashi Hattori, Okazaki; Masanori Hanaoka; Yukihide Hashiguchi, both of Toyota; Yoshinori Ootsuka, Okazaki; Hiroaki Yamaguchi, Anjo, all of Japan

[73] Assignees: Nippon Soken, Inc., Nishio; Toyota Jidosha Kogyo Kabushiki Kaisha, Toyota, both of Japan

[21] Appl. No.: 335,283

[22] Filed: Dec. 28, 1981

[30] Foreign Application Priority Data

Dec. 26, 1980 [JP] Japan ................................ 55-186271
Dec. 26, 1980 [JP] Japan ................................ 55-186272

[51] Int. Cl.³ .......................................... G01L 23/22
[52] U.S. Cl. .......................................... 73/35; 73/707
[58] Field of Search .................... 73/35, 115, 706–708; 123/425, 435

[56] References Cited

U.S. PATENT DOCUMENTS

| 1,957,894 | 5/1934 | Longenecker | 73/707 |
| 2,306,372 | 12/1942 | Banks | 73/35 |
| 3,865,100 | 2/1975 | Kanai et al. | 73/707 |
| 4,166,382 | 9/1979 | Petersen | 73/115 |
| 4,266,421 | 5/1981 | McDougal | 73/35 |

Primary Examiner—James J. Gill
Attorney, Agent, or Firm—Cushman, Darby & Cushman

[57] ABSTRACT

A method of sensing a knocking taking place in an internal combustion engine through the sensing of pulsative component of the cooling water pressure or lubricating oil pressure. The sensing of the pulsative component is made by removing the static component from the composite pressure which is the sum of the pulsative component and the static component. An apparatus for sensing a knocking taking place in an internal combustion engine has a differential pressure sensing mechanism including a pressure sensing diaphragm and a pulsation absorption mechanism. The pressure sensing diaphragm receives at its one side the composite cooling water pressure or composite lubricating oil pressure which is the sum of the pulsative component and static component. The pulsation absorption mechanism absorbs the pulsative component from the composite pressure so as to transmit only the static component of the pressure to the other side of the pressure sensing diaphragm. In consequence, the pressure sensing diaphragm is deflected only in response to the pulsative component of the pressure without being affected by the static component.

1 Claim, 10 Drawing Figures

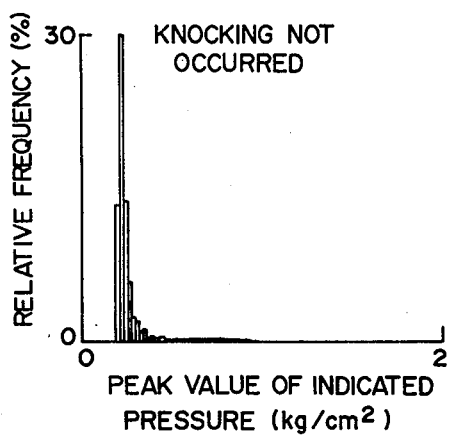
FIG. IA
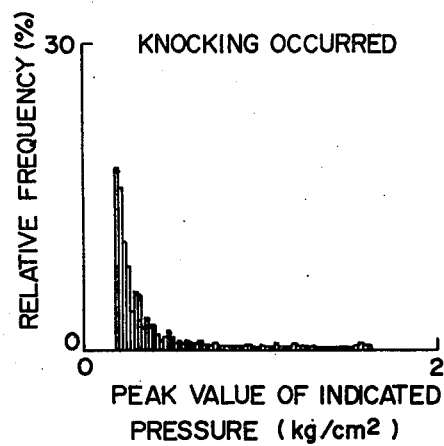
FIG. IB
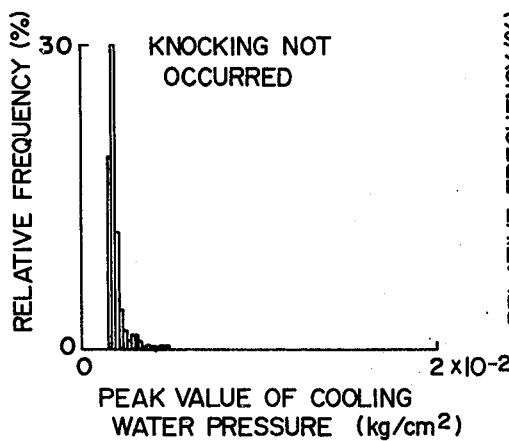
FIG. IC
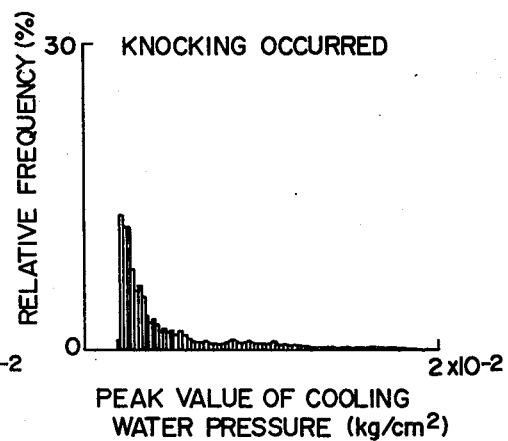
FIG. ID

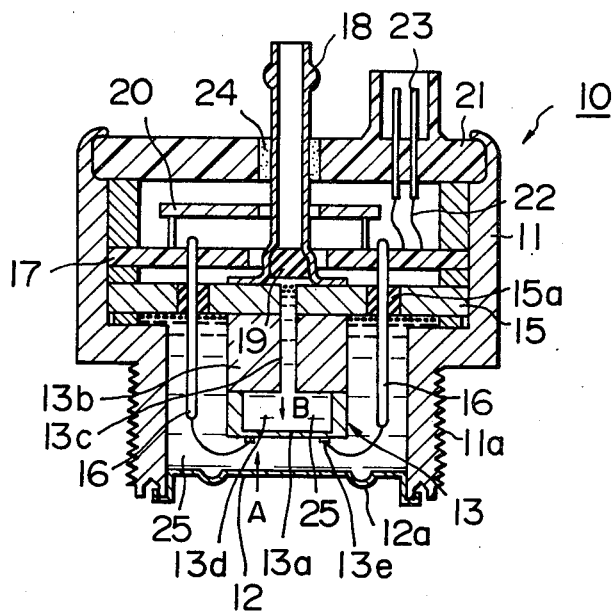
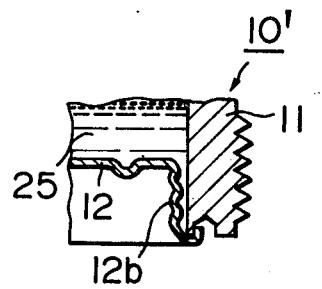
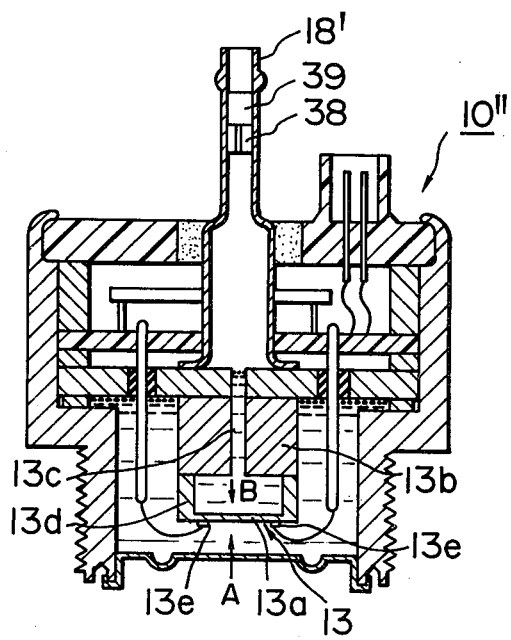

METHOD OF AND APPARATUS FOR SENSING KNOCKING IN INTERNAL COMBUSTION ENGINE

BACKGROUND OF THE INVENTION

The present invention relates to a method of and apparatus for sensing knocking taking place in an internal combustion engine, suitable for use in the ignition timing control for optimizing the ignition timing. More particularly, with the knowledge that the pressure impulse generated in the cylinder as a result of the knocking is transmitted to the cooling water through the cylinder wall or to the lubrication oil, the invention aims at providing a method of and apparatus for sensing knocking taking place in the internal combustion engine through sensing the pulsation of pressure of the cooling water or lubricating oil.

As is well known, there is a close relation between the ignition timing and the internal pressure in the cylinder of the engine. In the explosion of the mixture in the cylinder after the ignition, the internal pressure of the cylinder does not include any higher harmonic if no knocking is taking place in the cylinder. The "higher harmonics" are the vibration components of frequencies normally ranging between 5 and 10 KHz and between 11 to 13 KHz, determined by the bore diameter of the cylinder and the sonic speed during combustion. The higher harmonics are produced as a result of discontinuous quick combustion. If a knock takes place in the cylinder, the internal pressure of the cylinder comes to involve the higher harmonics when the internal pressure is increased to the level near the maximum combustion pressure. In consequence, a specific vibration or sound is transmitted to the outside of the cylinder. More specifically, in the initial state of the knocking referred to as "trace knock", the higher harmonics start to appear at the crank angle corresponding to the maximum combustion pressure. Then, as the knocking becomes stronger to the state called "light knock" and then to "heavy knock", the crank angle at which the higher harmonics appear is shifted to the advancing side, i.e. toward the crank angle corresponding to the ignition, from the crank angle of the maximum combustion pressure.

It is possible to remarkably improve the efficiency of the engine by optimumly controlling the ignition timing, through a precise detection of the shift of timing of the higher harmonics.

However, as well known to those skilled in the art, there are following problems or difficulty in sensing the knocking through the detection of pressure impulse in the cylinder.

(1) It is true that the direct detection of the internal pressure of the cylinder by a pressure detector is the most efficient way of sensing of the knocking. This, however, requires an independent detector for each of a multiplicity of cylinders of the engine, so that the cost of the knocking sensor is raised uneconomically. In addition, it is quite difficult to construct such a pressure detector of moderate price as being capable of stably operating at high temperature and pressure for the controlling purpose. In fact, there still is no pressure detector commercially available and practically usable for the purpose described.

(2) It is also known that the knocking can be sensed indirectly through detecting, for example, the vibration transmitted to the outside of the cylinder. The engine block constituting the cylinder, however, has a vibration transmitting characteristics peculiar thereto. Thus, the change of the internal pressure cuased by the knocking tends to be attenuated or filtered before it is picked up at the outside of the engine block. Namely, the sound/noise ratio S/N is lowered to make the detection difficult. Thus, the signal picked up at the outside of the engine block does not correctly represent the change of the internal pressure caused by the knocking, so that the ignition timing control system often fails to operate adequately. This problem is serious particularly when the engine has a multiplicity of cylinders. Namely, it is difficult to sense the knocking in the cylinder remote from the position of the vibration detector. In addition, the noises such as valve down noise impedes the precise detection of the noise. Thus, this knocking sensing system is still unsatisfactory. Although it is possible to effect a feedback control of the ignition timing with this knocking sensing system, the control circuit tends to become complicated to avoid erroneous operation. Thus, for achieving the satisfactory knocking sensing performance, the system inevitably becomes more expensive and complicated.

SUMMARY OF THE INVENTION

Under these circumstances, the present inventors have made various studies to find out a knocking sensing method which would makes it possible to sense the knocking more accurately than the known sensing methods, and reached a conclusion that a precise sensing of the knocking taking place in the engine can be achieved through a detection of the pressure propagated through the cooling water or lubrication oil in the engine.

According to one aspect of the invention, there is provided a method of sensing a knocking taking place in an internal combustion engine, in which the static pressure component of the cooling water or lubrication oil from the composite pressure which is the sum of the static pressure component and the pulsative pressure component, so that only the pulsative pressure component is detected as a sign of a knocking taking place in the engine.

According to another aspect of the invention, there is provided a knocking sensing apparatus comprising a diaphragm adapted to be deflected by the pressure of the cooling water, and a detecting means adapted to operate in response to the deflection of the diaphragm only in a manner like an alternating current or in a differential manner, so that the static pressure component of the pressure is removed to permit the detection of only the pulsative component of the pressure.

According to still another aspect of the invention, there is provided a knocking sensing apparatus constructed as a pressure-differential detector one side of which is provided with a compressible material or an integrating function while the other side of the same receives the pressure of the lubricating oil.

The above and other objects, features and advantages of the invention will become clear from the following description of the preferred embodiments taken in conjunction with the accompanying drawings.

BRIEF DESCRIPTION OF THE DRAWINGS

FIGS. 1A to 1D are characteristic charts showing the relationship between the pulsation of the internal pressure of a cylinder in an internal combustion engine and the pulsation of cooling water pressure in the engine;

FIG. 4 is a sectional view of a knocking sensing apparatus constructed in accordance with an embodiment of the invention;

FIG. 5 is a fragmentary sectional view of a knocking sensing apparatus in accordance with a second embodiment of the invention; and FIG. 6 is a sectional view of a knocking sensing apparatus constructed in accordance with still another embodiment of the invention.

DESCRIPTION OF THE PREFERRED EMBODIMENTS

FIGS. 1A and 1B show the relative frequencies of pulsation of the internal pressure of cylinder of a straight type engine, in the state where a knocking is not taking place and in the state where the knocking is taking place, respectively, while FIGS. 1C and 1D show the pulsations in the cooling water pressure in the same engine under the same operating condition, in the state where a knocking is not taking place and in the state where the knocking is taking place, respectively. From the comparison of these Figures, it will be seen that the pulsation in the cooling water pressure substantially approximates the pulsation in the internal pressure. This means that a highly precise sensing of the knocking can be achieved through the detection of the pulsation in the cooling water pressure. It is also understood that this sensing method can apply not only to a single cylinder engines but also to the engines having a multiplicity of cylinders.

The level of the pulsation of cooling water pressure is generally in the order of 0.1 Kg/cm$^2$ or lower. Meanwhile, a static pressure of the order of 0.9 to 1.5 Kg/cm$^2$ is applied to the cooling water circulation system. Therefore, in order to sense the pulsation of the water pressure at a practically acceptable degree of precision, it is preferred to detect only the pulsative component of the pressure while removing the static pressure component.

Usually, the internal combustion engine is equipped with a forcible lubricating system adapted to circulate a lubrication oil to various parts requiring the lubrication. It has been confirmed also that, when a knocking is taking place in a cylinder or cylinders, the higher harmonics caused by the knocking are transmitted also to the lubrication oil to generate a pulsation in the lubrication oil pressure. The present inventors have found that a high frequency signal of a frequency of 4 to 10 KHz, which is substantially equal to the frequency of the higher harmonic caused by the knocking, can be obtained by measuring the lubrication oil pressure. A static pressure determined by the state of operation of the engine is continuously applied to the lubricating oil. In order to precisely catch the pulsation of the lubrication oil pressure, therefore, it is desirable to eliminate the static pressure component to permit the detection of only the pulsative component of the lubrication oil pressure. As a result of various studies, the present inventors have reached a conclusion that such an elimination of the static pressure component can be achieved efficiently and effectively by the use of a pressure differential type detector.

Figure 2:
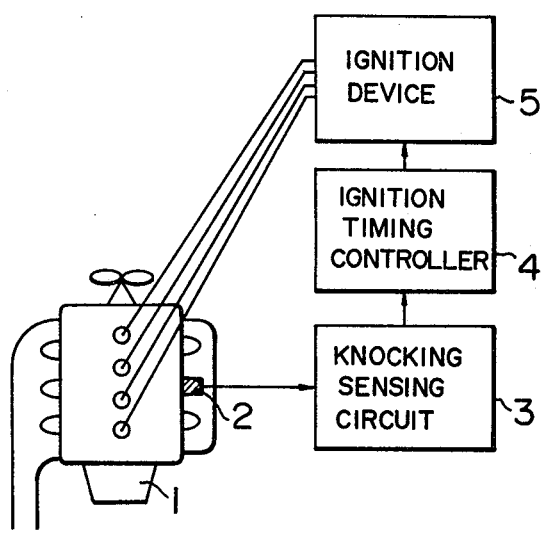
FIG. 2 is a block diagram of a knocking feedback system.

Referring now to FIG. 2 showing a knock feedback type ignition system incorporating a knocking sensing apparatus of the invention, the system has a knocking sensing circuit 3 adapted to sense the occurrence of a knocking through an output signal from a knock sensor 2, and an ignition timing controller 4 adapted to advance or delay the ignition timing in accordance with the output from the sensing circuit 3. The output signal from the controller 4 is delivered, through a known ignition device 5, to sparking plugs of an engine 1 to generate sparks to ignite the air fuel mixture sucked into the cylinders.

The knocking sensing circuit 3 senses the occurrence of the knocking in the following manner. A sampling of the noise components of the vibration of engine is effected by making use of the output from the aforementioned sensor 2, in a predetermined period of time or in a predetermined range of crank angle from the moment or crank position of ignition. In such a period or crank angle range, the knocking of the engine does not take place. Similarly, the sampling of the pressure is made by the same sensor 2 in a period or crank angle range after the T.D.C. (after the peak of indicator pressure), in which the knocking is probable to take place. The judgement as to whether the knocking is taking place or not is made by means of the ratio of the level between the output from the sensor 2 in the first period or crank angle range immediately after the ignition and that in the second period or crank angle range after the T.D.C. The comparison may be made in the form of independent sample values or in the form of integrated values, i.e. mean values. Alternatively the judgement of occurrence of the knocking is made as a matter of probability, e.g. by the evaluation of number of cycles suffering the knocking in 100 successive ignitions.

The knocking sensing apparatus of the invention can be applied to any known system adapted for controlling the ignition timing upon detect of the occurrence of the knocking. The detailed explanation of the control system, therefore, is omitted here.

Figure 3A:
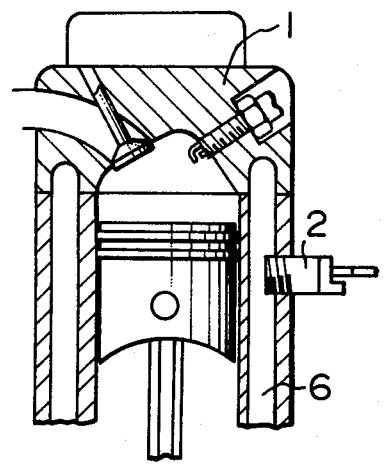
FIGS. 3A and 3B are illustrations of mounting of a knocking sensing apparatus in accordance with the invention.

FIG. 3A shows how the knocking sensor 2 is mounted in the cooling water system 6. The knocking sensor 2 is attached by screwing to the wall defining a cooling water system surrounding the cylinder walls of a straight type engine 1 having four cylinders, in such a manner that one end of the sensor 2 is exposed to the water in the cooling water system. Another water pressure pick-up port is connected to the portion of the cooling water system of a level substantially to the level of attaching of the sensor 2.

Figure 3B:
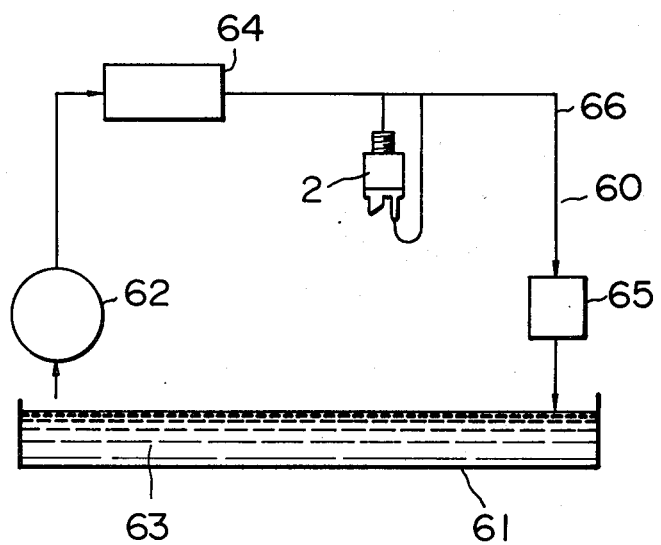

FIG. 3B shows the knocking sensor 2 mounted in the lubricating oil system 60. The knocking sensor 2 is attached by means of a screw to the engine block, cylinder head or the like part of a straight type internal combustion engine 1 having four cylinders. The other end of the sensor constituting an oil pressure pick-up port is connected to the portion of the oil pipe 66 near the sensor 2. A reference numeral 61 denotes an oil pan provided at the bottom portion of the engine. The lubricating oil 62 accumulated in the oil pan 61 is sucked and delivered by an oil pump 62 to the portion 65 of the engine requiring the lubrication, through an oil filter 64 adapted to remove any foreign matters and contaminants from the lubricating oil 63 thereby to clean the latter. The oil after lubricating various parts of the engine is collected again in the oil pan 61. In this lubricating oil system 60, the knocking sensor 2 is connected to the lubricating oil pipe 66 between the oil filter 64 and the lubricated portions 65 of the engine. It will be seen that the lubrication oil in this oil pipe 66 is pressurized by means of the oil pump 62.

Referring now to FIG. 4, a knocking sensing apparatus 10 in accordance with a first embodiment of the invention has a diaphragm 12 exposed to the cooling water or the lubricating oil and adapted to be deflected by the change of the water pressure or the oil pressure, a housing 11 provided at its lower end with a threaded portion 11a for mounting, a pressure sensing portion 13 incorporating a strain gauge, a printed circuit board 17 adapted to receive a signal from the pressure sensing portion 13 through leads 16, a base 15 to which the pressure sensing portion 13 is attached by welding, soldering or the like, a pressure introduction pipe 18 fixed to the base 15 by welding or soldering for introducing the cooling water or the lubricating oil, a hybrid type amplifier circuit 20 provided on the printed circuit board 17, and a connector 21 made of a synthetic resin. The diaphragm 12 is provided with an annular recesses 12a which functions to facilitate the deflection of the diaphragm 12.

The diaphragm 12, which forms a fluid chamber in the housing, has a generally disc-like form having a peripheral edge bent to extend along the inner peripheral surface of the housing 11 and is fixed at its entire periphery to the housing 11 by welding, caulking or the like method. The pressure sensing portion 13, which forms therein another fluid chamber, has a cup-like form constituted by a bottom diaphragm portion 13a adapted to be deflected in accordance with the difference between the pressures applied to both sides thereof, a cylindrical passage portion 13b provided with a central passage 13c and a plurality of semiconductor strain gauges 13e adhered to the lower side of the diaphragm portion 13a. The central passage 13c provides a communication between the pressure introduction pipe 18 and a pressure chamber 13d defined at the inner side of the diaphragm portion 13a. The resistances of the semiconductor strain gauges 13e are changed in accordance with the pressure differential across the diaphragm portion 13a, i.e. the difference between the pressures applied to both sides of the diaphragm portion 13a.

Each of the leads 16 is connected at its one end to the strain gauges 13e on the diaphragm portion 13a and connected at its other end to the printed circuit board 17. The lead 16 is fixed to the base 15 of the knocking sensing apparatus 10, while being insulated from the base 15 by a seal 15a of glass system generally referred to as "hermetic seal".

The electric amplifier circuit 20 is adapted to amplify the output from a bridge circuit formed by four strain gauges attached to the diaphragm portion 13a, to a required level. The output from the electric amplifier circuit 20 is delivered to the outside of the knocking sensing apparatus through lines 22 and connector pins 23. A connector 21 is adhered in a sealed manner to the pressure introduction pipe 18, by means of an adhesive 24 and fixed to the housing 11. A member 19 disposed in the pressure introduction passage 18 is made of a compressible material such as urethane, rubber or the like, and is adapted to absorb the pulsative component of the water pressure or the oil pressure of the cooling water or the lubricating oil thereby to respond only to the static component of the water pressure.

The fluid chambers are filled with an incompressible liquid 25 such as silicon oil, insulating oil or the like having no chemical action on the material of the diaphragm.

The apparatus is attached at its threaded portion 11a to the block of the engine in such a manner that the diaphragm 12 contacts the cooling water or lubricating oil in the cooling water or lubricating oil system of the engine. In this state, as explained before, the cooling water or lubrication oil pressure in the portion near the sensing apparatus is introduced through the pressure introduction pipe 18. The pressure sensing diaphragm portion 13a receives at its one side the cooling water pressure or lubricating oil pressure which is transmitted as indicated by an arrow A through the diaphragm 12 and the liquid 25. On the other hand, the other side of the diaphragm portion 13a receives the cooling water or lubricating oil pressure which is transmitted as indicated by an arrow B through the pressure introduction pipe 18, compressible member 19 and then the incompressible liquid 25.

In operation, when knocking is taking place in the engine, the perpendicular wave of the pulsative pressure of cooling water or lubrication oil, generated by the distortion of the cylinder wall as a result of the knocking, is propagated through the cooling water or the lubricating oil to reach the diaphragm 12 and the inlet of the pressure introduction pipe 18. The pulsative pressure of the cooling water or the lubricating oil has a high frequency component of a frequency ranging between 6 and 10 KHz. This pulsative component, however, is absorbed by the compressible member 19 in the pressure introduction pipe 18, so that the cooling water pressure or lubricating oil pressure applied to the diaphragm portion 13a in the direction of the arrow B is equivalent to the static component of the water or oil pressure.

At the same time, the composite pressure of the cooling water or lubricating oil, which is the sum of the static component and the pulsative component generated as a result of the knocking, is applied to the pressure sensing diaphragm portion 13a in the direction of the arrow A. In consequence, the diaphragm portion 13a is deflected by the difference between the pressures applied to both sides thereof, i.e. the pulsative component of the cooling water pressure or lubricating oil pressure generated as a result of the knocking. This deflection of the diaphragm portion 13a is detected electrically as a change in the output from the bridge circuit formed by the strain gauges. Thus, an electric signal corresponding to the pulsative component of the cooling water or lubricating oil pressure is obtained and transmitted, after an amplification by the amplifier circuit, to the knocking sensing circuit 3.

Thus, according to the invention, the static component of the cooling water or lubricating oil pressure is removed from the composite pressure which is the sum of the static and pulsative components, so that only the pulsative component of the pressure generated by the knocking is sensed. Since the pressure can be propagated through water or lubricating oil with a smaller attenuation than the propagation of the vibration through the engine block, it is possible to sense the occurrence of the knocking in any one of a multiplicity of cylinders, by means of a single knocking sensing apparatus.

In addition, the small attenuation of the pulsative component of the pressure ensures a higher accuracy of sensing of the knocking, while avoiding any eroneous sensing.

FIG. 5 shows a knocking sensing apparatus 10' constructed in accordance with a second embodiment of the invention. The knocking sensing apparatus 10' of this embodiment differs from the knocking sensing apparatus 10 of the first embodiment in that the disc-shaped diaphragm 12 is provided with a bellows portion 12b. The bellows portion 12b effectively absorbs the change in the internal pressure attributable to the thermal expansion or contraction of the incompressible liquid 25. The knocking sensing apparatus 10' of this embodiment is suitable for use particularly in such a case that the expansion coefficient of the incompressible liquid 25 is so large as to deteriorate the precision of the sensing of knocking.

FIG. 6 shows a knocking sensing apparatus 10" constructed in accordance with a third embodiment of the invention. The knocking sensing apparatus 10" of this embodiment is distinguished form the embodiment shown in FIG. 4 by the following features.

Namely, the knocking sensing apparatus 10" of this embodiment has a pressure introduction pipe 18' having a base end portion of a diameter greater than that of the pressure introduction pipe 18 of the embodiment shown in FIG. 4. A filter 39 and an orifice 38 are mounted in the pressure introduction pipe 18', in place of the compressible member 19 used in the embodiment. The orifice 38 has an orifice port of such a small diameter as to impede the flow of the cooling water or lubricating oil therethrough, so that the orifice 38 functions as an integrating element. As in the case of the first embodiment, the cooling water or lubricating oil pressures are applied in both directions A and B. It is possible to use the diaphragm 12 of the second embodiment shown in FIG. 5 with the bellows 12b, also in the knocking sensing apparatus of the third embodiment. By so doing, it is possible to avoid any deviation of the output of the apparatus attributable to the thermal expansion of the incompressible liquid 25, thereby to assure a higher precision of sensing of knocking.

In operation, the integrating element constituted by the orifice 38 and the pressure chamber downstream from the orifice 38 functions, as in the case of the compressible member in the first embodiment, to absorb the pulsative component of the composite pressure which is the sum of the static component and the pulsative component of the cooling water or lubricating oil pressure. In consequence, only the static component of the pressure is applied in the direction of the arrow B. The pulsation absorption effect of the integrating element becomes greater as the diameter of the orifice port becomes smaller and as the volume of the pressure chamber becomes larger.

As in the case of the first embodiment, the diaphragm portion 13a receives also the composite pressure which is the sum of the pulsative component and static component of the cooling water or lubricating oil pressure in the direction of the arrow A. The knocking sensing apparatus 10", therefore, precisely detects only the pulsative component of the cooling water or lubricating oil pressure regardless of the static component. The filter 39 is adapted to catch and remove foreign matters such as dusts and other contaminants thereby to prevent the orifice 38 from being clogged with such foreign matters. If the mesh of the filter 39 is so fine as to impose a large resistance to the flow of the cooling water or the lubricating oil, the filter 39 can function to some extent as an element for removing the pulsative component of the cooling water or lubricating oil pressure. Therefore, in some cases, the absorption of the pulsative component can be achieved solely by the filter 39.

As has been described, in the knocking sensing apparatus 10" of this embodiment, the pressure sensing diaphragm portion 13a receives at its one side the composite pressure which is the sum of the static component and the pulsative component of the cooling water or lubricating oil pressure, while the other side of the diaphragm portion 13a receives only the static component of the cooling water pressure or lubrication oil pressure, because the pulsative component of the pressure is effectively absorbed by the pulsation absorption mechanism. Therefore, the knocking sensing apparatus 10" of this embodiment can detect the knocking taking place in the engine without being affected by the static component of the cooling water or lubricating oil pressure. For this reason, the pressure sensing diaphragm portion can be constructed to have a high sensitivity even to a delicate change of the pressure applied thereto, so that the precision of sensing of the knocking can be improved remarkably. Furthermore, the means for removing the static component of the cooling water or lubricating oil pressure can be obtained simply by disposing a compressible member or an integrating element in the pressure introduction passage. The knocking sensing apparatus of the invention, therefore, can be produced in a reduced size and at a sufficiently low cost. In the described embodiments, the means for sensing the differential pressure is constituted by a semiconductor diaphragm. This, however, is not exclusive and any arrangement which can detect the deflection of the diaphragm can be used as the means for sensing the pressure differential. For instance, it is possible to use a diaphragm with strain gauges bonded thereto.

What is claimed is:

1. An apparatus for sensing a knocking taking place in an internal combustion engine comprising;
    a housing attached to a portion of an internal combustion engine suitable for sensing a knocking;
    a first diaphragm fixed to an end of said housing and exposed to a cooling water or a lubricating oil of said engine for responding to a composite pressure of a static component and a pulsative component of said cooling water or lubricating oil;
    a first fluid chamber defined by at least by said first diaphragm and a part of said housing for holding therein an incompressible fluid;
    a pressure sensing means disposed in said housing and including a second diaphragm, one side of said second diaphragm being exposed to said first fluid chamber and being contacted with said incompressible fluid, said pressure sensing means forming therein a second fluid chamber by at least the other side of said second diaphragm;
    a pressure sensing element attached to said second diaphragm;
    pipe means for transmitting the pressure of said cooling water or said lubricating oil to said second fluid chamber;
    pulsation removing means disposed in said pipe means for removing said pulsative component of said cooling water or lubricating oil and applying only the static component to said other side of said second diaphragm.

* * * * *